United States Patent [19]

Dunn

[11] Patent Number: 5,016,732

[45] Date of Patent: May 21, 1991

[54] PORTABLE COMBINATION HUNTING AND OBSERVATION STAND

[76] Inventor: Stewart A. Dunn, P.O. Box 898, Forest City, Ark. 72335

[21] Appl. No.: 234,738

[22] Filed: Aug. 22, 1988

[51] Int. Cl.$^5$ ............................................. A45F 3/26
[52] U.S. Cl. ................................... 182/116; 182/187; 182/107
[58] Field of Search ................ 182/187, 188, 116, 107

[56] References Cited

U.S. PATENT DOCUMENTS

| | | | |
|---|---|---|---|
| 3,057,431 | 10/1962 | George | 182/163 |
| 3,318,415 | 5/1967 | Christie | 182/116 |
| 3,336,999 | 8/1967 | McSwain | 182/20 |
| 3,630,314 | 12/1971 | Bamburg | 182/116 |
| 3,703,939 | 11/1972 | Maxwell | 182/116 |
| 4,061,202 | 12/1977 | Campbell | 182/20 |
| 4,134,474 | 1/1979 | Stavenau | 182/187 |
| 4,246,981 | 1/1981 | Stavenau | 182/116 |
| 4,257,490 | 3/1981 | Bandy | 182/116 |
| 4,545,460 | 10/1985 | Byrd | 182/107 |
| 4,552,246 | 11/1985 | Thomas | 182/116 |
| 4,552,247 | 11/1985 | Purdy | 182/187 |
| 4,614,252 | 9/1986 | Tarner | 182/116 |

*Primary Examiner*—Reinaldo P. Machado
*Attorney, Agent, or Firm*—Nixon & Vanderhye

[57] ABSTRACT

A portable combination observation and hunting stand having a lower and middle ladder portion interconnected with each other with the middle ladder portion interconnected to a third, upper portion which comprises of a seat platform and an separate standing platform, all of which is abuttable to a tree or other support structure at a unique angle and is securely attached thereto by a chain or cable having a first end attached to the upper ladder portion at the end of the outer vertical upright then extending around the tree to a turnbuckle or load binder pivotally connected on the opposite side of the seat platform and adjustable according to the circumference of the selected tree or other support structure.

8 Claims, 10 Drawing Sheets

PORTABLE COMBINATION HUNTING AND OBSERVATION STAND

BACKGROUND OF THE INVENTION

The object of the present invention is to provide a comfortable, light-weight and easily transported, quickly assembled for use and easily disassembled, by one person, elevated platform or seat from which to observe and/or hunt game and other wildlife as well as events such as sports, parades, etc.

Another object of the invention is to provide a portable observation and hunting stand that insures the maximum safety of the user by permanent all welded construction of the upper portion which comprises the seat platform and standing platform, the middle and lower portions, connection of upper section to tree or support structure by means of a chain or cable and turnbuckle or load binder, connection of middle section to tree or support structure by means of a stabilizer strap, securing of lower section by inserting tubular ends of lower section into the ground.

A further object of this invention is to provide a portable hunting and observation stand that employs any size tree or other support structure but will not harm or damage such tree or support structure.

The foregoing objects are realized as a lightweight, portable hunting and observation stand which includes a lower ladder section, a middle ladder section, and an upper ladder section which incorporates a standing platform and a seating platform.

LIST OF DRAWINGS

FIG. 1 Disassembled stand being utilized as a sled
FIG. 2 Perspective view of the stand with 36 numbered points and 3 sections, a lower, middle and upper
FIG. 3 Side view of the stand
FIG. 4 Front view of the stand
FIG. 5 Top view of seat platform with detail
FIG. 6 Bottom view of seat platform with detail
FIG. 7 Side view of seat platform with detail
FIG. 8 Top view of standing platform with detail
FIG. 9 Bottom view of standing platform with detail
FIG. 10 Side view of standing platform with detail
FIG. 11 Side view of top section of the stand with detail
FIG. 11A Side view of reference numeral 1 on FIG. 11
FIG. 11B Front view of reference numeral 1 on FIG. 11
FIG. 11C Side view of reference numeral 6 on FIG. 11
FIG. 11D Front view of reference numeral 6 on FIG. 11
FIG. 12 Perspective view of stand as assembled for transporting by an individual
FIG. 13 Side view of stand resting against a tree with two safety supports in place Referring now to FIG. 2 it will be seen that the invention which has been illustrated comprises a ladder of tubular structural steel or other suitable metals, the vertical rail components of which are designed in the lower section by reference numbers 31 and 32, in the middle section by reference numbers 29 and 30, and in the upper section by reference numbers 20 and 21 and the horizontal portions of which are designated by reference numbers 22 through 28. The horizontal sections are attached, as are all metal-to-metal attachments herein, by the welding process.

As seen in FIG. 3, the vertical rail components of the upper section are curved at a 96 degree angle so as to form a rounded support which, when the assembled structure is leaned against a tree or other support structure, with the standing and seating platforms horizontal to the ground, will place the ends of the vertical tall components a sufficient distance from the tree or other support structure to utilize the weight of the hunter or observer to stabilize the stand and increase safety. The curving of the vertical rail components will also allow the user to utilize the stand, when it has disassembled and packed for transporting, as a skid or sled for hauling game, equipment, or other objects simply by turning it over, as illustrated in FIG. 12.

FIG. 4 is a frontal view of the entire structure, indicating the joinder of the lower, reference numbers 31 and 32, the middle, reference numbers 29 and 30, and the upper, reference numbers 29 and 30, sections. As can be seen in FIG. 4, the upper end of the vertical rails of the lower ladder section, reference numbers 31 and 32, fit into the lower end of the vertical rails of the middle ladder section, reference numbers 29 and 30, and the upper end of the vertical rails of the middle section in turn fit into the lower end of the vertical rails of the upper ladder section, reference numbers 20 and 21.

As indicated in FIG. 2, the vertical rails of the lower and middle sections of the stand have sleeve-fit upper end portions, reference numbers 35 and 36 and reference numbers 33 and 34, respectively, which are slightly smaller in outside diameter than the inside diameter of the vertical rails into which they fit.

FIG. 5 is a top view of the seat platform, which is attached to the end of the horizontal portion of the vertical rails of the upper section, reference numbers 20 and 21, and depicting the V-shaped angle rail, reference number 11, which abuts the tree or other support structure against which the stand rests and depicts the placement of eyelets, reference numbers 7 and 8. A chain or cable, reference number 9, is attached to one of these eyelets, wrapped around the tree or other support structure and is attached a turnbuckle or load binder, reference number 10, which in turn is pivotally connected to the other eyelet. The turnbuckle or load binder, reference number 10, can be adjusted to create tension in the chain and thus securely and safely attach the stand to the tree or other support structure.

FIG. 2 illustrates the tubular metal braces, reference numbers 18 and 19, which attach at each end of the curved, vertical rails, reference numbers 21 and 20, respectively.

Figure 1:
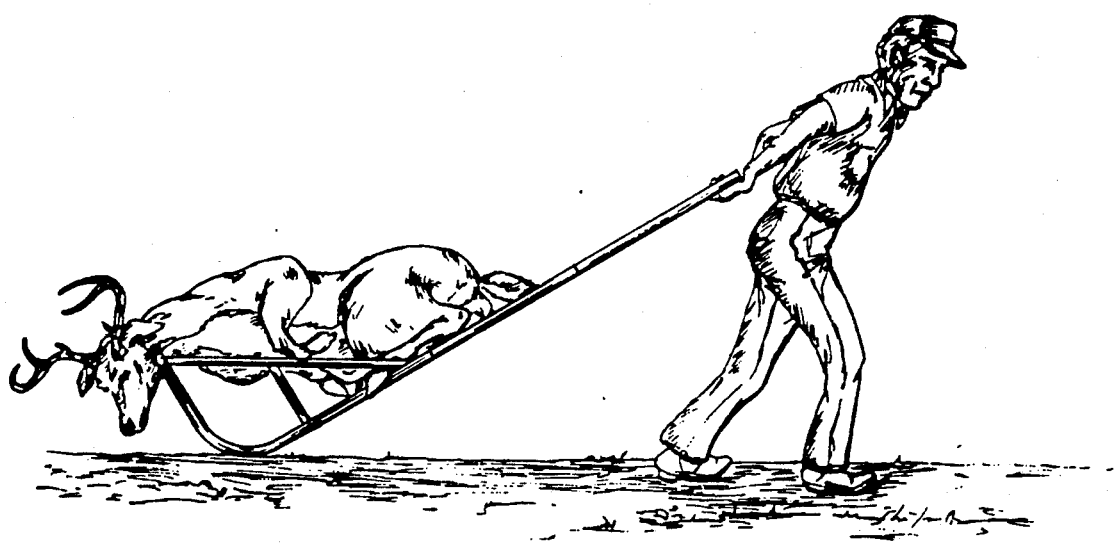
Figure 2:
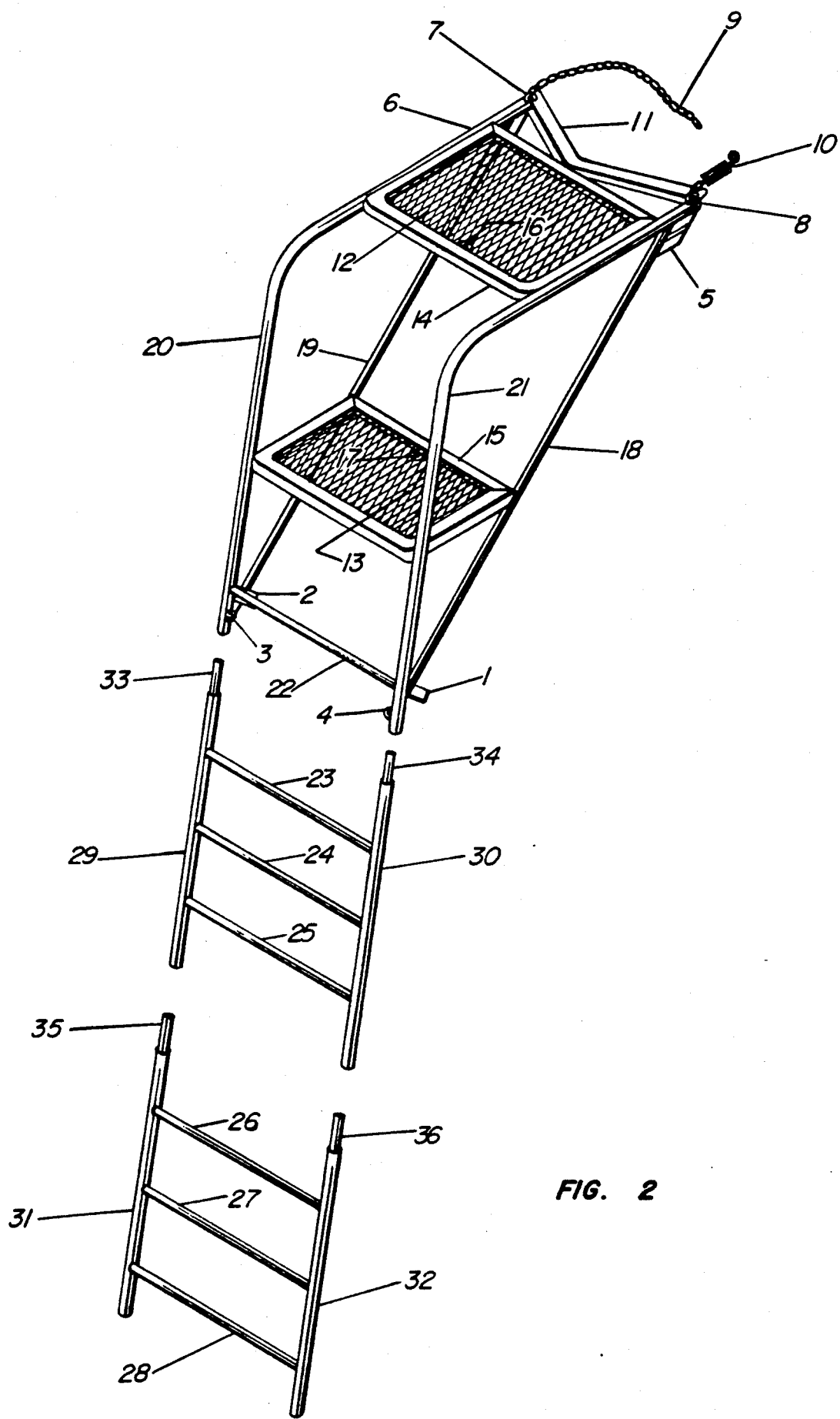
Figure 3:
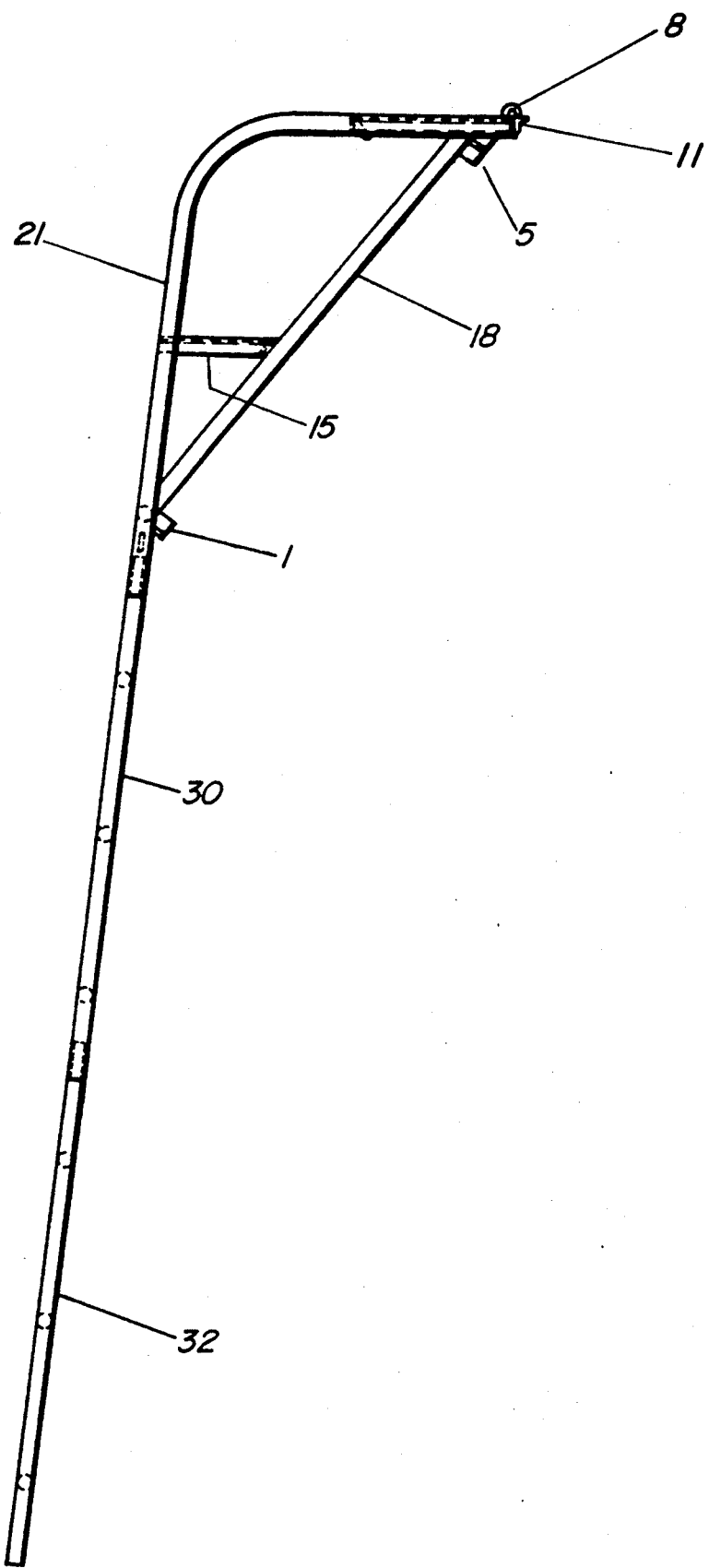
Figure 4:
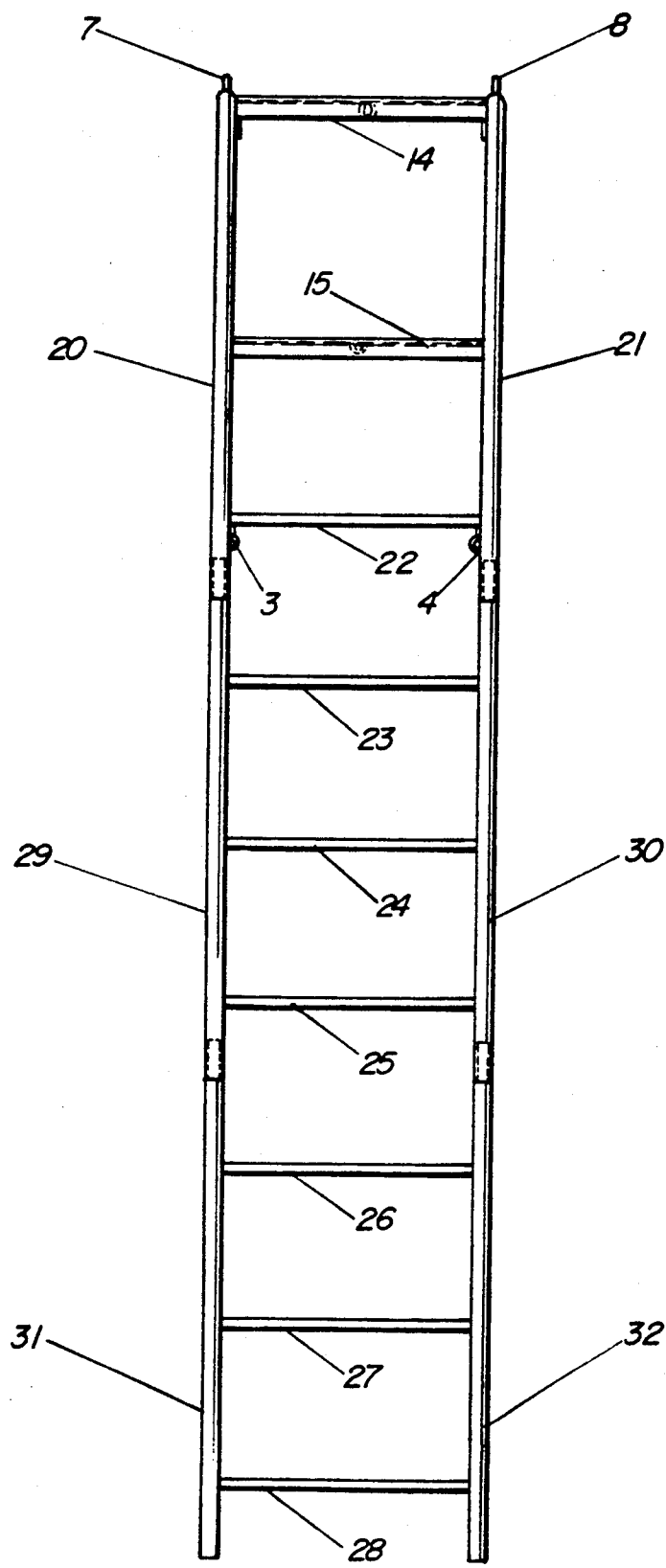
Figure 5:
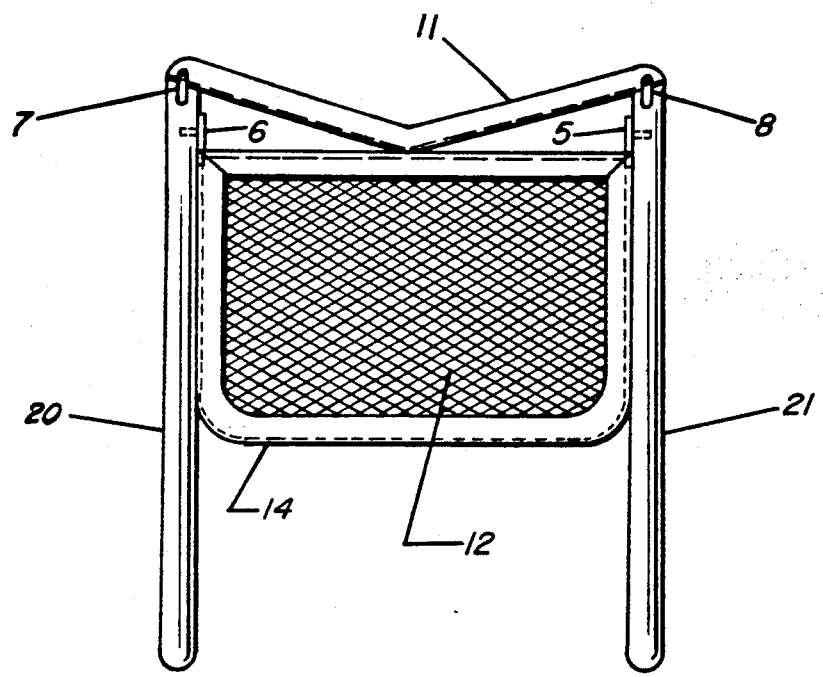
Figure 6:
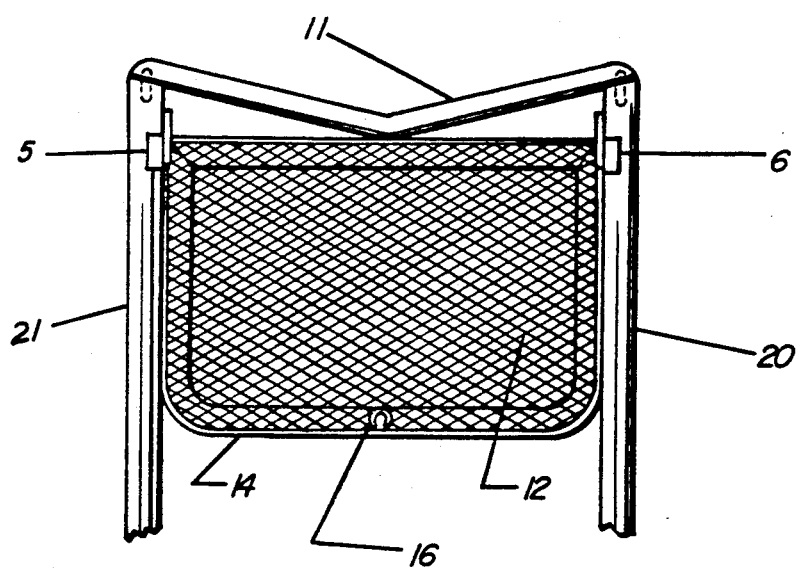
FIG. 6 is a bottom view of the platform seat detailing the placement of the eyelet, reference number 16, to which is attached a flexible and elastic rubber strap, reference number 37, to secure the three sections to each other when the stand is disassembled for transport or storage.
Figure 7:
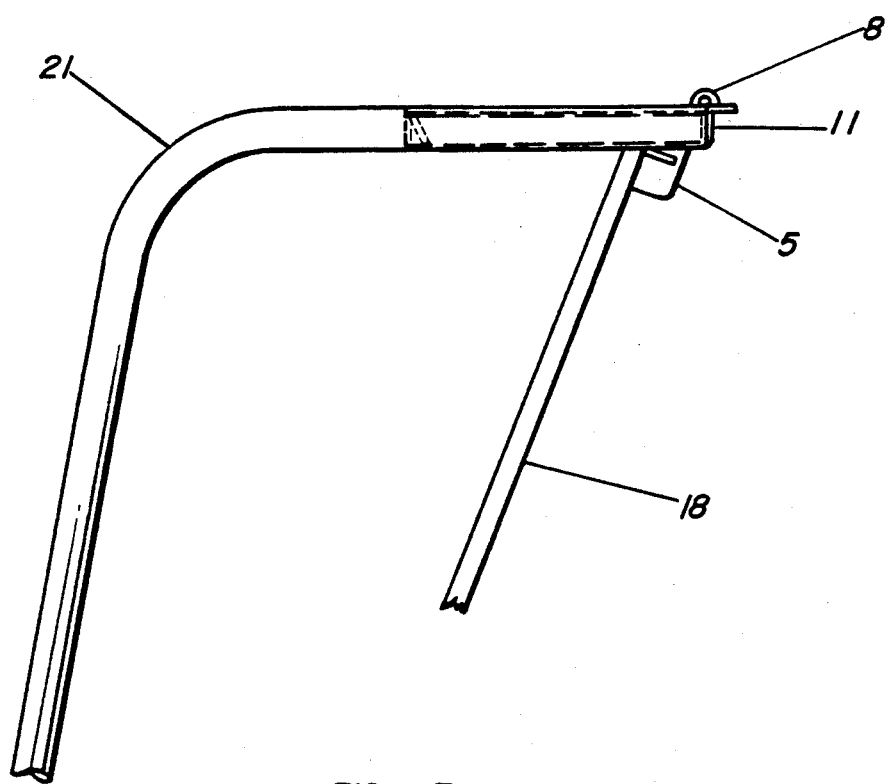
FIGS. 7 and 10 are side views of the seat and standing platform portions of the upper section of the stand.
Figure 8:
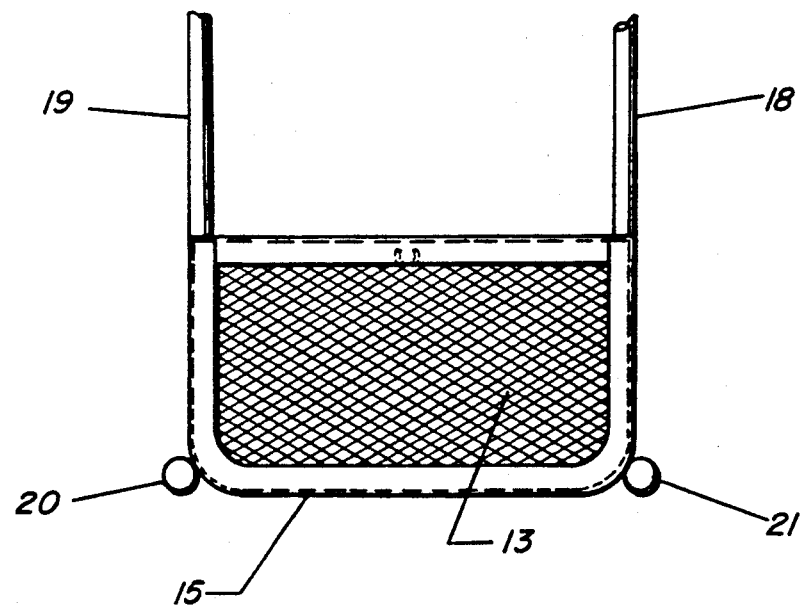
FIGS. 8 and 9 are top and bottom views of the standing platform portion of the upper section of the stand, depicting particularly the location of the eyelet, reference number 17, to which is attached the flexible and elastic rubber strap which secures the three components to each other when the stand is disassembled for transport or storage.
Figure 9:
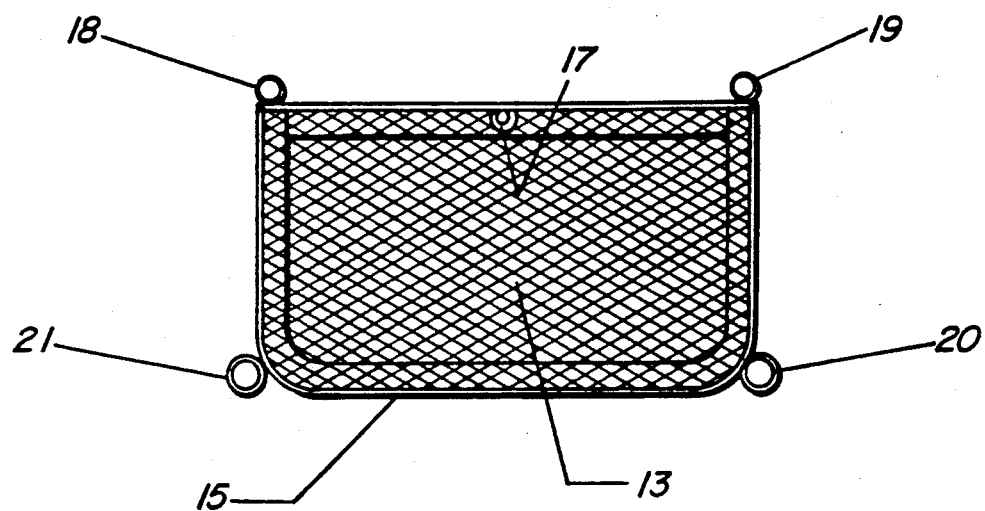
Figure 10:
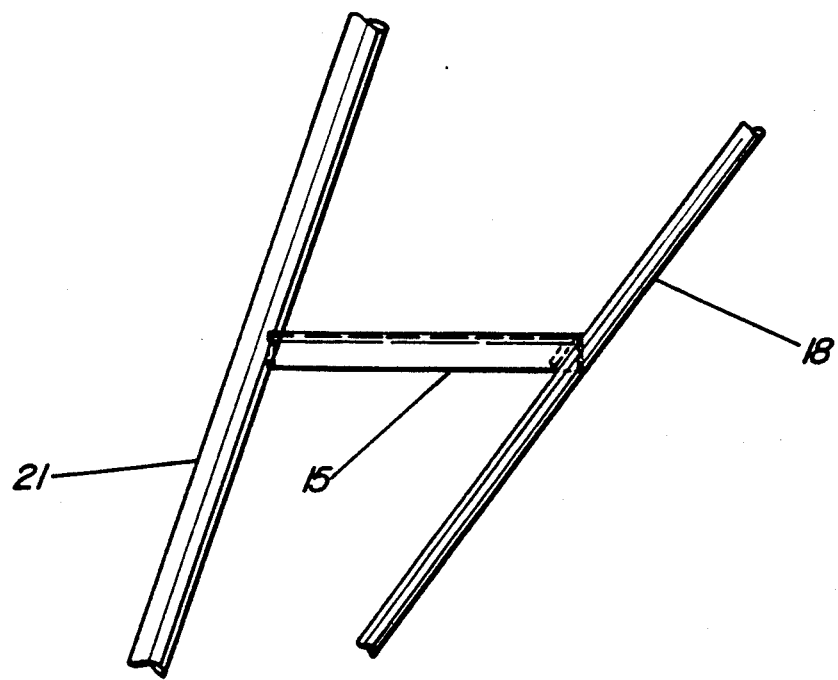
Figure 11:
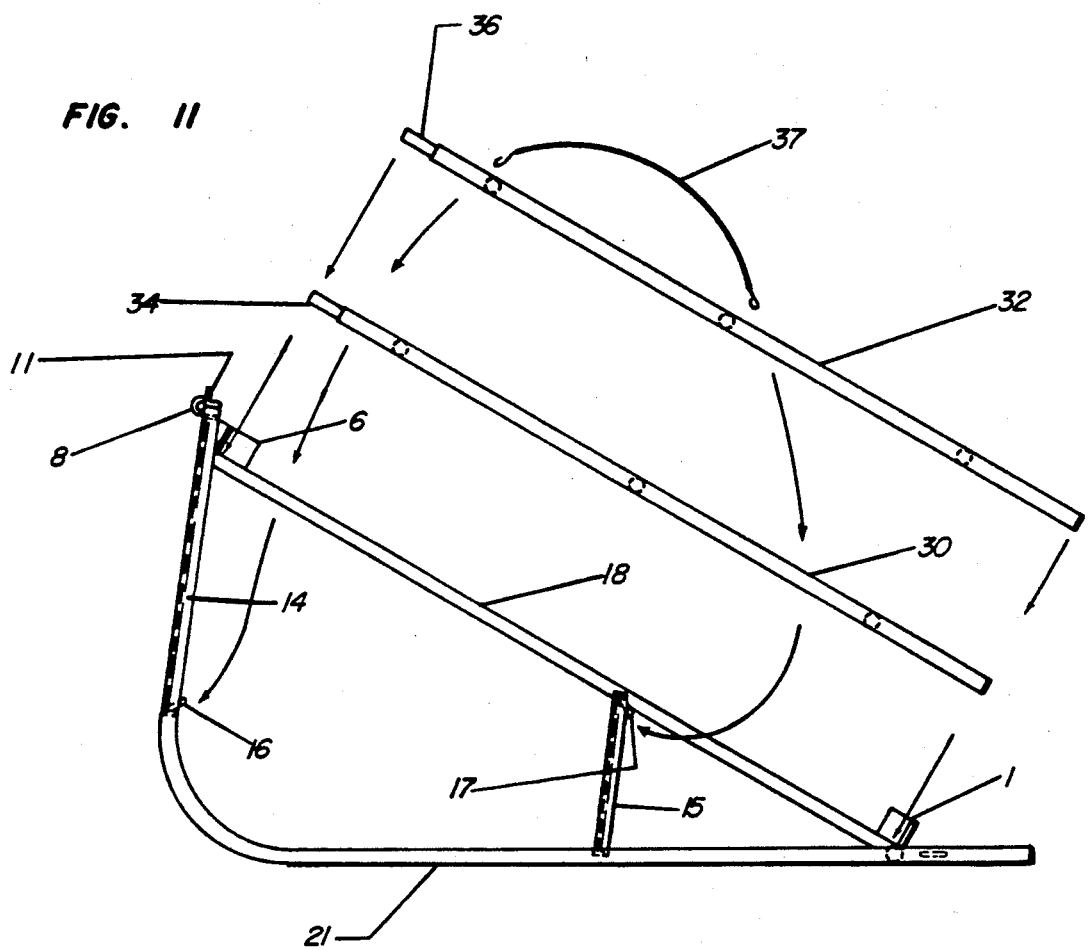
Figure 11A:
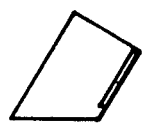
Figure 11B:
Figure 11D:
Figure 11C:
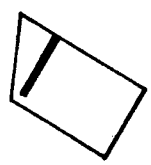

FIG. 2 indicates the location and position, at reference numbers 1, 2, 5 and 6 of trapezoidal metal pieces which are fabricated with rectangular metal pieces at right angles to the trapezoidal metal pieces which facilitate the storage or soundless transport of the stand when it is disassembled as a stand and then reassembled for transport or storage. As seen in FIG. 11, the lower section, reference number 32, and the middle section, reference number 30, when separated will nest snuggly on top of the diagonal rails, reference numbers 18 and 19, with the ends of each rail adjoining and abutting the fabricated trapezoidal metal pieces thus preventing slippage and noise and facilitating transport and storage. FIG. 11 also illustrates the method of strapping the three sections together for transporting and storage using the flexible, elastic rubber strap, reference number 37.

Figure 13:
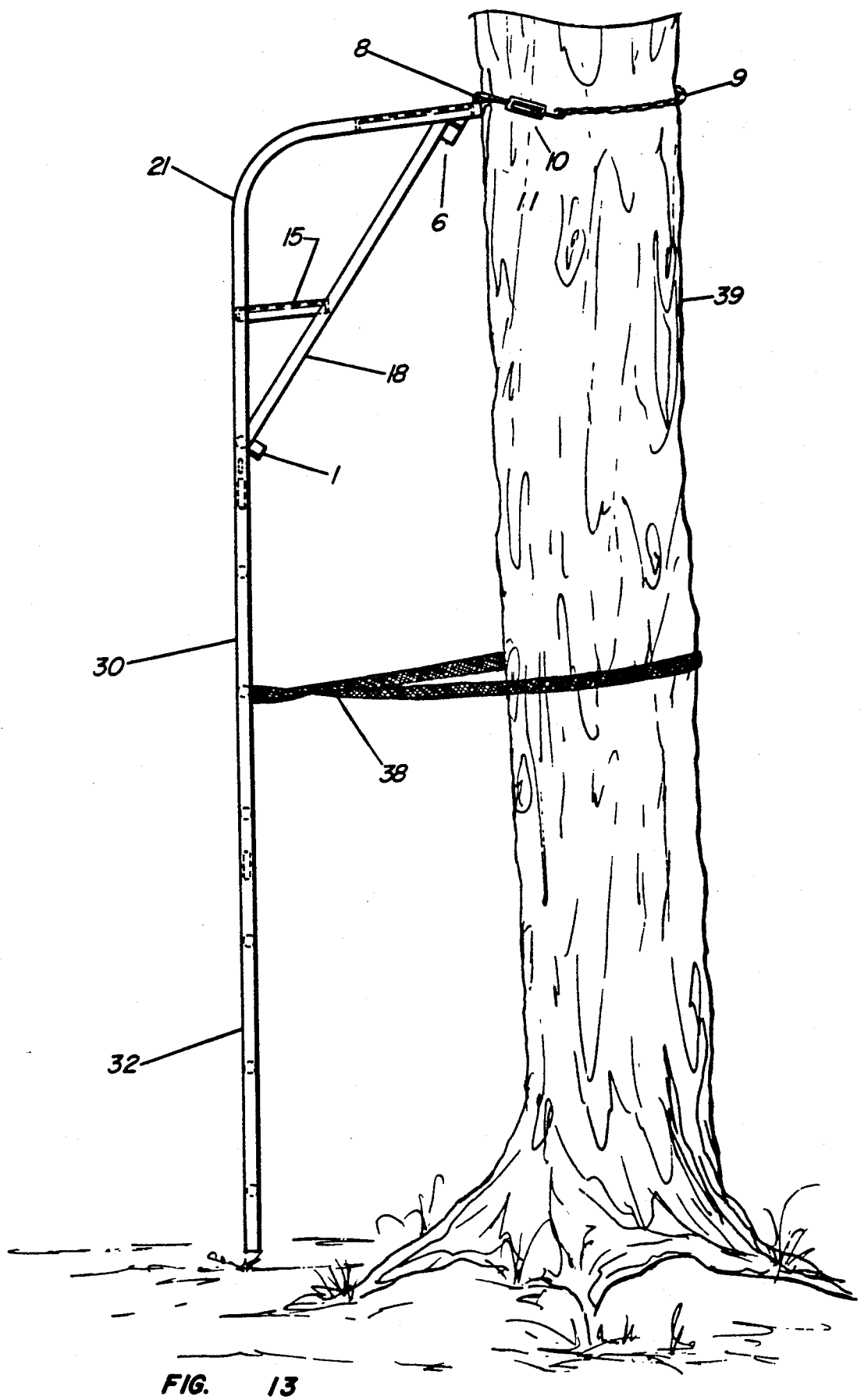

FIG. 13 shows a stabilizer strap, reference number 38, which provides additional safety and stability when the stand is in use, which is made of a flexible fabric material such as polypropylene or the likes, which is attached to a horizontal rail, or rung, reference number 24, wrapped around the tree, reference number 39, or other support surface which the stand abuts, and is then securely attached to the same, or another, horizontal rail, or rung, providing additional safety and stability.

FIGS. 11 and 11A-11D depict the stand assembled for transport or storage being used to transport game, equipment, or other heavy loads.

Figure 12:
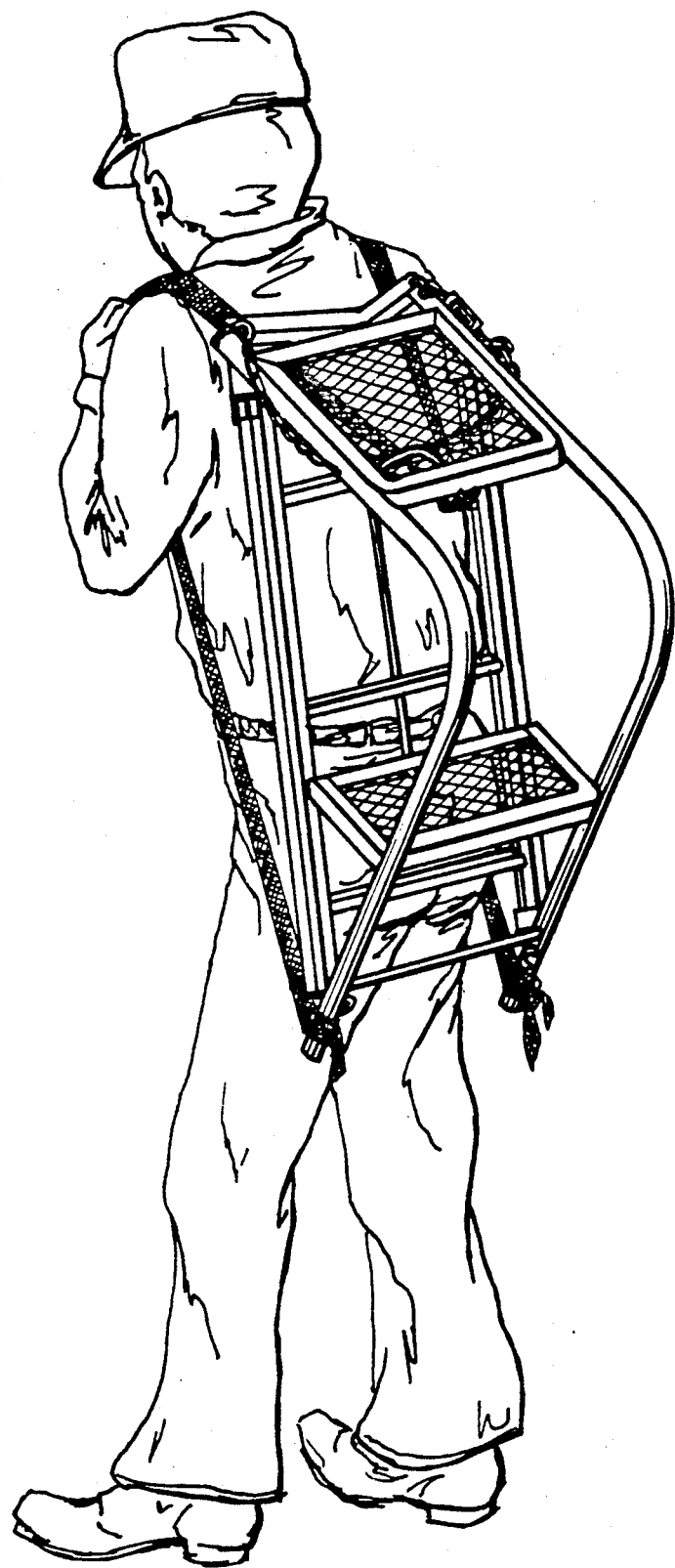

FIG. 12 depicts the stand assembled for transport or storage being transported.

What is claimed as new is as follows:

1. For use as an observation and hunting stand comprising a ladder assembly of three connectible parts consisting of a lower section of outer vertical rail components separated by horizontal rails, or rungs, a middle section of outer vertical rail components separated by horizontal rails, or rungs, the length of said outer vertical rails to be equal to the length of the outer vertical rails of the lower section, and an upper section of outer vertical rail components which curve at a 96 degree angle to become outer horizontal rail components and are separated by a horizontal rail, or rung, and further separated at a point below the curve by a metal standing platform spaced generally the same distance above the next lower horizontal rail, or rung, and in a plane with said rung, and topped with a second, larger, metal seating platform attached to the horizontal portion of the outer horizontal rails, spaced generally the same distance above the standing platform as the standing platform is above the next lower horizontal rail, or rung, with eyelets attached at various points on said upper section to facilitate the attachment of removable strapping devices to secure the stand to a tree or other support structure and to secure the three sections together when disassembled and arranged for transport.

2. The continuation of claim 1 wherein said upper section includes diagonal tubular braces respectively attached to the outer rail components of said upper section, wherein said upper section includes a V-shaped metal component attached to the horizontal portion of the outer rail components of said upper section, and wherein the standing platform in the upper section is attached to the vertical portion of the outer rail components and the diagonal tubular braces, the seat platform is attached to horizontal portion of outer rail components and the V-shaped metal component, permanently by the welding process.

3. The continuation of claim 1 wherein a turnbuckle or load binder is pivotally connected to an eyelet on the upper end of the vertical rail components, and an eyelet attached to the topside of the rear of the seat platform attached to the opposite vertical rail component, to which is removably attached a chain which is adapted to extend around the far side of the tree trunk or other support structure and engage the unattached end of the turnbuckle and the turnbuckle may be used to tighten the chain about the tree or other support structure.

4. The continuation of claim 1 with the attachment of a stabilizer strap of a flexible fabric material such as polypropylene to the horizontal rail, or rung, next above the lower-most horizontal rail, or rung, of the middle section of the stand, thence around the tree or support structure and, after creating sufficient tension is attached at the other end to the same horizontal rail, or rung.

5. The continuation of claim 1 with the attachment of a V-shaped metal horizontal component at the upper ends of each curved vertical rail, on a plane with and level with the seat platform, and having the 'V' of the component abutting the seat platform, and said component, and the ends distal to the 'V' juncture, attached to the upper ends of each curved vertical rail which will then abut the tree or support structure, with that section abutting the tree having no sharp points or objects to damage the ecological integrity of the tree or support structure.

6. The combination of claim 1 in which is included trapezoidal metal pieces fabricated with rectangular metal pieces attached at right angles to the plane of the trapezoidal metal pieces and wherein the shorter portion of the trapezoid is attached to each outer rail component of the upper section at a point directly below the seating platform and opposite each other, and smaller trapezoidal metal pieces fabricated with rectangular metal pieces attached at right angles to the plane of the trapezoidal metal piece and wherein the shorter portion of the trapezoid is attached to each outer rail component of the upper section at a point at the lower end of the rail component of the upper section and opposite each other, and the distance between the larger and smaller of the trapezoidal metal pieces on each outer rail component of the upper section to be equal to the length of the vertical rail component of the middle and lower sections of the connectable parts.

7. The combination of claim 1 in which is included fabricated trapezoidal metal pieces attached to the upper section and in which is included an attachment of an eyelet underneath and midway between the two rear corners of the rear edge of the standing platform and at a 90 degree angle to the vertical side of the angle iron framing of the standing platform, and the attachment of an eyelet on bottom of and midway between the front corners of the front edge of the seating platform and at right angles to the vertical side of the angle iron framing of the seating platform, and a flexible and elastic rubber strap with a hook attached to each end of said strap with one hook attached to the seating platform eyelet and, after the stand is separated into its three parts and the lower and middle vertical rails placed stop one another and then placed stop the tubular diagonal rails of the upper section with each end of the vertical rails juxtaposed against one of the fabricated trapezoidal metal pieces, the hook at the distal end of the flexible elastic rubber strap, after the strap is drawn over the horizontal rails of the lower and middle platform sections is then attached to the standing platform eyelet, to secure the threee sections into one transportable section.

8. A ladder assembly of three connectible parts consisting of a lower section of outer vertical rail components separated by horizontal rails, or rungs, a middle section of outer vertical rail components separated by horizontal rails, or rungs, the length of said outer vertical rails to be equal to the length of the outer vertical rails of the lower section, and an upper section of outer vertical rail components which curve at a 96 degree angle to become outer horizontal rail components and are separated by a horizontal rail, or rung, and further separated at a point below the curve by a metal standing platform spaced generally the same distance above the next lower horizontal rail, or rung, and in a plane with said rung, and topped with a second, larger, metal seating platform attached to the horizontal portion of the outer horizontal rails, spaced generally the same distance above the standing platform as the standing platform is above the next lower horizontal rail, or rung, with eyelets attached at various points on said upper section to be assembled in a transportable mode with tubular rails or brace attached to the upper ends of each curved vertical rail, with the opposite end of said tubular rail or brace attached to the other end of each vertical rail, which, when the assemblage is placed on a flat surface with the longer straight portion of the curved vertical rail touching the ground along its entire length, form the containing rails of a sled or skid for transporting game, equipment, or other heavy objects, which, when the vertical rails distal to the curved portion are raised for pulling, facilitates such transport in that only a small portion of the curved section of the vertical rail actually contacts the flat surface.

* * * * *